July 8, 1958     J. REGAN     2,842,386

SPRAY ELIMINATOR FOR WIRE LINE STRIPPERS

Filed May 24, 1954     2 Sheets-Sheet 1

INVENTOR.
JOHN REGAN
BY HIS ATTORNEYS.
HARRIS, KIECH, FOSTER & HARRIS

July 8, 1958  J. REGAN  2,842,386
SPRAY ELIMINATOR FOR WIRE LINE STRIPPERS
Filed May 24, 1954  2 Sheets-Sheet 2

INVENTOR.
JOHN REGAN
BY HIS ATTORNEYS.
HARRIS, KIECH, FOSTER & HARRIS

2,842,386

SPRAY ELIMINATOR FOR WIRE LINE STRIPPERS

John Regan, Palos Verdes Estates, Calif., assignor to Regan Forge and Engineering Co., San Pedro, Calif., a corporation of California Application May 24, 1954, Serial No. 431,831

6 Claims. (Cl. 286—16)

This invention relates to equipment for wiping or stripping wire lines being withdrawn from oil wells in connection with the removal of swabs or similar equipment where the wells are under high gas pressures. Commonly, the high well pressures in which wire lines are used cause the spaces between the strands of the wire lines to receive oil under pressure, this extending into the interior of such stranded lines. As a consequence, when the lines are withdrawn through the typical wiper and reach the atmosphere, the high pressure developed within the strands of the lines causes the high pressure oil to spray out from the lines and over the equipment being employed and over the workmen who are operating the well.

It is a principal object of this invention to provide means for wire line strippers which will trap out the high pressure oil characteristically escaping from the interior of the stranded lines as the lines are moved from the stripping means into a region of atmospheric pressure. By means of the present invention the oil spraying out is trapped in a low pressure zone and bled off through ported means without escape of the spray into the open air around the well.

It is also an object of this invention to provide an improved form of equipment for lining up the wire when being installed, and also to provide improved equipment for compressing the typical compressed rubber body which is characteristically employed as the stripping means. The latter improvement may be in the form of a split bushing which serves to facilitate the wire line threading, and when assembled about the wire serves to compress the stripper and also to provide a spray-collecting housing, the latter carrying in a preferred form a secondary wiper.

It is consequently another object of this invention to employ in one element a spray-receiving and discharge cavity and a stripper compressor, with or without a secondary wiper.

It is also an object of this invention to provide in a wire line stripper a structure which minimizes the characteristic damage to the usual rubber stripper body as the wire line is pulled outward through the stripper body while under well pressure.

Other objects of the invention and various features of construction thereof will become apparent to those skilled in this art upon reference to the following specification and to the accompanying drawings forming a part hereof.

Figure 1:
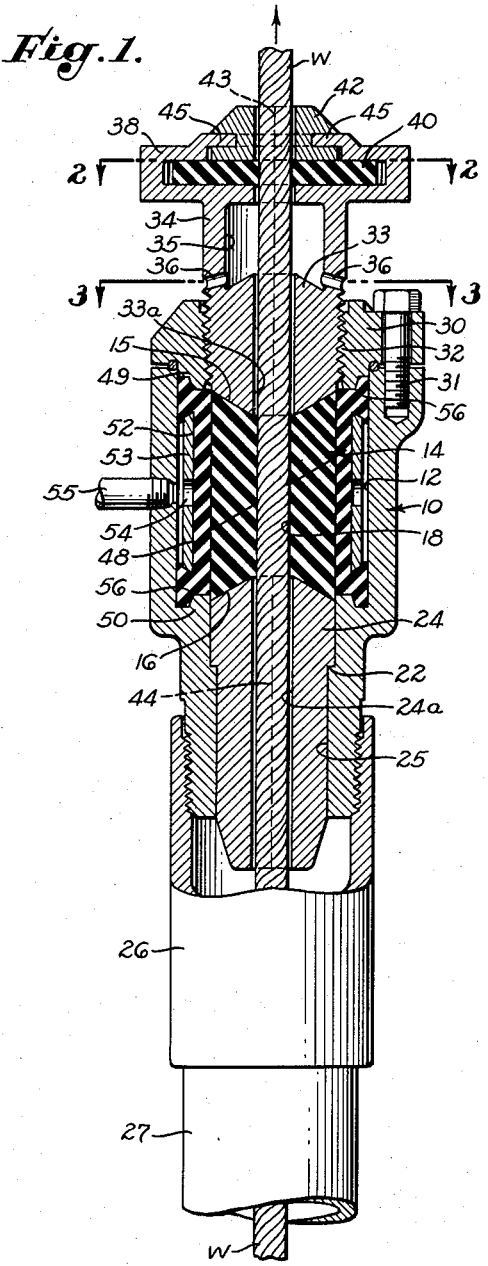
Fig. 1 is a vertical section through one form of stripper of this invention.
Figure 2:
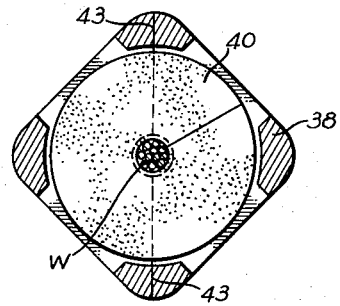
Fig. 2 is a cross section taken on the line 2—2 of Fig. 1.
Figure 3:
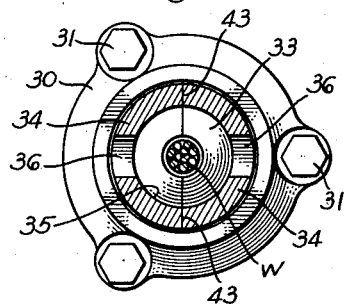
Fig. 3 is a cross section taken on the line 3—3 of Fig. 1.
Figure 4:
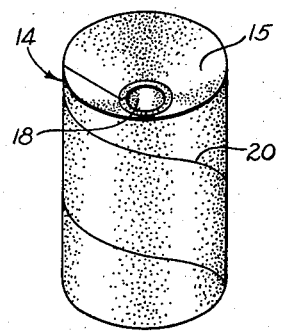
Fig. 4 is a perspective view of an improved rubber stripper employed with the particular compressing means of this invention.

As illustrated in Fig. 1, the line stripper comprises a body or housing 10 which is normally arranged in vertical position and contains an axial bore 12 which receives a compressible rubber stripper 14. The upper end of the stripper 14 is cupped as indicated at 15 by inwardly sloping conical walls, the lower end or inner end of the compressible stripper 14 being also cupped as indicated at 16 by means of inwardly sloping conical walls. The stripper 14 is provided with an axial passage 18 to receive a conventional wire line W to be wiped or stripped, and for convenience of application to the wire line the wall of the stripper is cut helically through to the passage 18 as indicated at 20. The lower portion of the housing 10 is conveniently shouldered at 22 to receive a corresponding shoulder 22 on a stripper-retaining plug member 24 whose upper end is tapered as illustrated to fit in the cup 16, such tapered construction tending to force the rubber of the stripper 14 radially outward rather than inward so as to guard against any tendency to force the rubber of the stripper 14 into the central bore 24a of the plug 24 around the wire line while the line is being stripped of oil on its surface. The lower end of the plug 24 neatly fits a lowermost bore portion 25 in the lower end of the body or housing 10. In the particular form shown the outer lower extremity of the housing 10 is threaded for introduction into a collar 26 upon the upper end of a length of well pipe 27 through which the wire line W extends into the well being operated.

The upper end of the housing 10 carries a retention flange or ring 30 which is secured upon the upper end of the housing 10 as by screws 31 and is internally threaded at 32 to receive a threaded packing nut 33 which is tapered at its inner end to enter the cup 15 in the upper end of the compressible rubber stripper 14 and tend to expand the rubber radially outward and prevent crowding of the rubber inward and into the small space 33a around the wire line and thereby avoid tearing up the stripper 14. Integrally produced on the upper end of the packing nut 33 is an annular wall 34 which encloses an oil and gas-receiving chamber 35 which is vented at its lower end as indicated at 36 for the discharge of oil and such gas as may accompany collected oil spray. The annular wall 34 integrally carries at its upper end a secondary housing or enclosure 38 which contains a secondary wiper 40 such as a rubber disc apertured to pass the wire line W, the upper wall of the enclosure 38 also carrying a bushing 42 which may be an expendable, wear-receiving member against which the wire line W works as it characteristically moves out of line with its axis when being withdrawn. In actual construction the packing gland or packing nut 33, the upstanding annular wall 34 and the secondary housing or enclosure 38 are vertically split as indicated at 43, and if desired the lower packing retainer 24 may be split as indicated by the line 44. With the described arrangement, the two parts of the packing nut 33 and the enclosure 38 may be readily assembled about the wire line W, and the threads of the nut 33 then turned down into the annular, internally threaded flange or ring 30. This construction also provides very conveniently for the renewal of the soft metal bushing 42 when required, as well as renewal of the flat washer-like auxiliary wiper 40. As illustrated in Fig. 1, the upper wall of the enclosure 38 carries inwardly directed annular flange members 45 which are received in corresponding grooved portions of the bushing 42.

With reference to the positioning of the rubber stripper 14, this also is worn more or less rapidly by travel of the wire line W, and as a consequence it must be readily renewable. It is therefore provided with a normal external diameter equal to the lower bore 25 immediately above the shoulder 22, and corresponding closely also with the diameter of the threaded opening of the flange or ring 30 which receives the packing nut 33. Thus, the stripper 14 is readily removed and replaced, especially when both the ring 30 and the packing nut 33 are removed. The stripper 14 is for the most part carried within a surrounding, outer rubber sealing sleeve 48 which is contained within the previously mentioned bore 12 and is held down in position by means of a shouldered portion 49 of the retention ring 30, the lower end of the sleeve 48 being similarly positioned by a shouldered portion 50 of the housing 10 adjacent the upper portion of the plug or lower retainer 24 and the lower cupped or concave seat 16 of the stripper 14. As illustrated, the sealing sleeve 48 is provided with a wide external groove or passage-way indicated at 52, and within a portion of this groove the stripper 14 is surrounded by a metallic positioning sleeve or lantern 53 which is provided at an intermediate location with a series of ports 54 for transmission of fluid pressure radially inward against the adjacent wall of the stripper 14, which fluid pressure is supplied to the annular channel or groove 52 through a conduit 55. It will be noted that the ends of the lantern 53 are beveled, and that the shoulders 49 and 50 are somewhat similarly beveled in opposite directions so as to provide for the seating of re-entrant portions of the ends of the sealing sleeve 48, as seen for example at 56.

Thus, in using the described stripper and spray eliminator about a wire line being withdrawn from a well as indicated, fluid pressure is applied through the conduit 55 to the annular space 52 within the sealing sleeve 48, thereby to compress the sealing sleeve 48 and through it compress the stripper 14 into packing engagement with the wire line W. As the wire line W is withdrawn or pulled upward in the direction of the arrow of Fig. 1, the cup structure at 15 under the compressive influence of the packing gland or packing nut 33 results in a tendency to expand the rubber of the stripper 14 outward and upward and thereby reduce the tendency for the rubber of the stripper 14 to be drawn upward into the annular space around the wire line W and within the packing nut 33. As a consequence, although wear of the inner wall of the stripper by the wire line W is appreciable, nevertheless the life of such a stripper 14 is greatly prolonged because of the reduced tendency to tear up the inner surface of the rubber stripper 14 and drag it up into the passage through the packing nut 33. By cupping both ends of the stripper 14 alike, either end of such stripper may be first introduced into the housing 10 with the sealing ring 48.

Also, in the operation of the present improvement, as the wire line W is pulled upward, the oil which has been trapped in conjunction with high pressure gas within the interior of the line is captured in the chamber 35 within the upstanding annular wall 34 of the spray eliminator, and the spraying of such oil as it tends to be exploded by release of the high pressure within the wire and corresponding drenching of the crewmen and surrounding area are avoided. The captured oil then drains out of the discharge vents 36 at the bottom of the chamber 35 and runs down the sides of the housing 10 and underlying collar 26 and pipe 27 into the sump characteristically provided in conjunction with an oil well. Gas which is released with the released oil also escapes through the vents 36. Inasmuch as surplus oil remains on the surface of the wire line after pressure release in conjunction with the spraying or exploding of the escaping oil, such surplus oil is removed and fed back into the accumulating chamber 35 by the secondary wiper 40 which snugly engages the wire line by reason of having its central opening of somewhat smaller diameter than the diameter of the wire line W.

Additionally, after prolonged use of the soft metal bushing 42 at the top of the equipment, this may be readily renewed when the split nut 33 and enclosure 38 are removed. Similarly, when these parts are removed, a worn stripper is easily removed and replaced, this probably being best effected by removing the cap screws 31 and the flange or ring 30 so that, if necessary, the sealing sleeve 48 may be removed along with the stripper 14, a new sleeve being assembled therewith and the unit returned. Of course the stripper 14 may be removed without removing the sealing sleeve 48. In any event the wire guiding bushing 42 and the stripper 14, which become expendable items, may be readily renewed when required. Renewal of the sealing sleeve 48 is infrequent inasmuch as it is subjected to very little wear and therefore has a relatively prolonged life.

Figure 5:
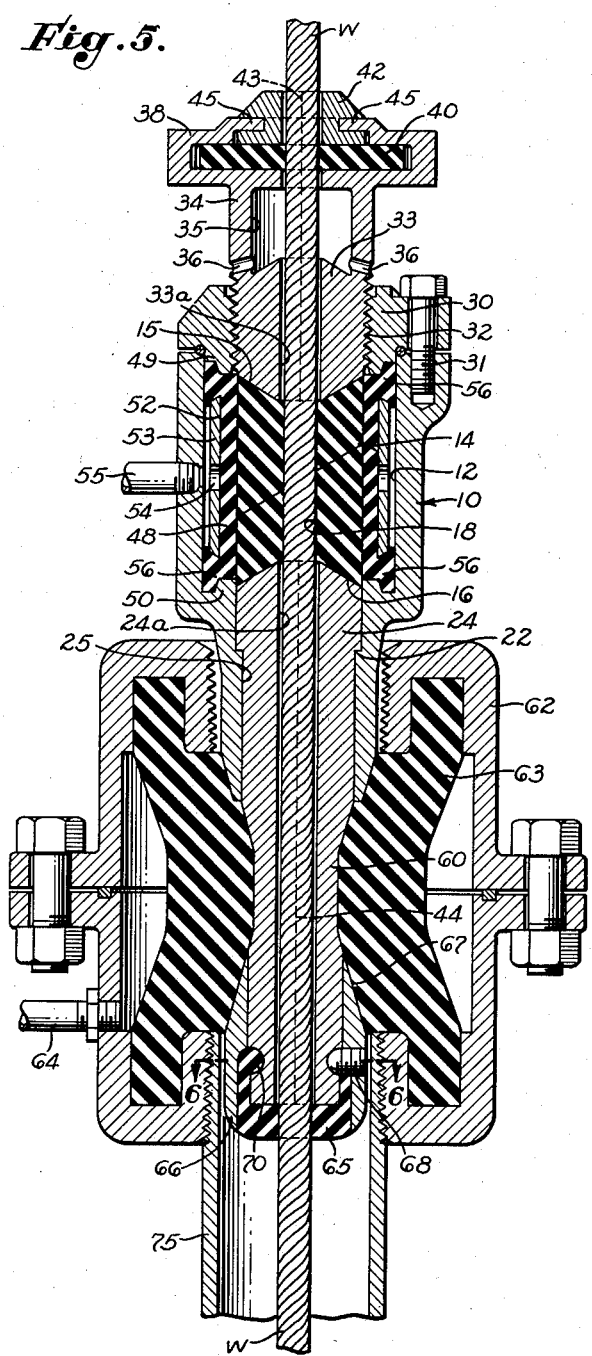
Fig. 5 is a vertical section similar to that of Fig. 1 and showing a modification.
Figure 6:
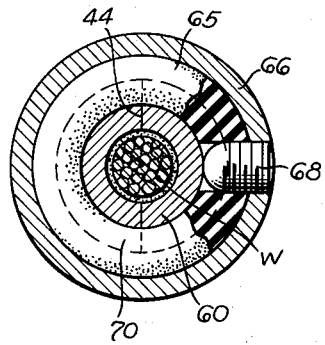
Fig. 6 is a horizontal section taken on the line 6—6 of Fig. 5.

The stripping and spray eliminating structure shown in Fig. 5 is substantially the same as that of the other figures, but the lower end thereof is provided with an external elongation of the stripper retainer member 24 to form a lower exposed section which becomes a mandrel 60 to receive any standard or preferred blowout preventer 62 containing a compressible rubber packer 63 adapted to be compressed against the mandrel by high pressure fluid supplied through a line 64. The lower extremity of the mandrel 60 carries a rubber bumper 65 confined by a lock ring 66 which tapers downward at 67 to an enlarged extremity and is secured by a headless set screw 68. The bumper 65 includes an upstanding annular wall provided with an annular bead 70 which is received in a corresponding annular groove in the adjacent side wall of the mandrel 60, the bead being locked in the groove by the ring 66 and the inner end of the set screw 68 seating in the same groove. The tapered portion 67 assists retention of the blowout preventer 62 in packing relationship. The bumper 65 acts to cushion shock of movement of an underlying striker bar commonly used and therefore not illustrated. As shown, the blowout preventer 62 is reversible so that either end may be threaded on a length of pipe 75.

Other variations will no doubt occur to those skilled in the art, and it is intended to protect all such forms as fall within the scope of the patent claims.

I claim as my invention:

1. In combination in line-stripping apparatus: a housing having a vertical longitudinal bore extending therethrough; a compressible stripper disposed in said bore and having a passage for a line extending axially therethrough, said compressible stripper having a helical cut radially therethrough and from end to end, the opposite ends of said compressible stripper being concave; a convex packing member in the inner end of said bore and having a convex end engaged in the adjacent concave end of said compressible stripper; a line-receiving member carried on the upper end of said housing and having an integral packing nut at its lower end disposed in the upper end of said housing, its lower end being convex and entering the adjacent concave end of said compressible stripper, and an apertured yieldable wiper provided on the upper end of said receiving member to wipe a line passing through said receiving member.

2. A combination as in claim 1 wherein said receiving member is split longitudinally from its upper end through said packing nut at its lower end, the combination including a mounting ring secured upon the upper end of said housing and having threads receiving the packing nut portions of said receiving member.

3. A combination as in claim 1 including a cage mounted upon the upper end of said line-receiving member and apertured to pass a line moving through such receiving member, said cage receiving said apertured yieldable wiper, the apertures of said cage and said wiper being aligned.

4. In combination as in claim 2 including a yieldable sealing sleeve disposed around said compressible stripper and within said housing and occupying an annular space in said housing below said mounting ring, the lower end of said sealing sleeve being sealed in the lower portion of said bore adjacent said packing member, and the upper end of said sleeve being sealed in the upper end of said bore by said mounting ring.

5. A combination as in claim 1 including a mounting ring secured on the upper end of said housing and receiving said packing nut, and a yieldable sealing sleeve disposed around said compressible stripper and within said housing and occupying an annular space in said housing below said mounting ring, one end of said sealing sleeve being sealed in the lower portion of said bore adjacent said packing member, and the other end of said sleeve being sealed in the upper end of said bore adjacent said mounting ring.

6. In combination in line-stripping apparatus: a housing having a vertical longitudinal bore extending therethrough; a compressible stripper disposed in said bore and having a passage for a line extending axially therethrough, said compressible stripper having a helical cut radially therethrough and from end to end, the opposite ends of said compressible stripper being concave; a convex packing member in the inner end of said bore and having a convex end engaged in the adjacent concave end of said compressible stripper; a line-receiving member carried on the upper end of said housing and having an integral packing nut at its lower end disposed in the upper end of said housing, the lower end of said packing nut being convex and entering the adjacent concave end of said compressible stripper; a cage on the upper end of said receiving member, said cage being apertured to pass a line moving through said receiving member; a yieldable wiper member in said cage and apertured to receive said line; and a removable split guide bushing carried by said cage above said wiper member and apertured to receive said line, said bushing being of relatively softer metal than said line to absorb wear.

References Cited in the file of this patent

UNITED STATES PATENTS

| | | |
|---|---|---|
| 1,387,301 | Osborne | Aug. 9, 1921 |
| 1,566,462 | Bashline | Dec. 22, 1925 |
| 1,821,096 | Hicks et al. | Sept. 1, 1931 |
| 2,163,007 | O'Dill | June 20, 1939 |
| 2,176,323 | Bowen et al. | Oct. 17, 1939 |
| 2,600,848 | Collins et al. | June 17, 1952 |